United States Patent [19]

Simon et al.

[11] Patent Number: 5,510,134
[45] Date of Patent: Apr. 23, 1996

[54] PROCESS FOR THE PRODUCTION OF HIGHLY CONCENTRATED FRUIT AROMAS FROM CONDENSED FRUIT VAPOURS

[75] Inventors: Andrea Simon, Seebruck; Jan Cully, Garching; Heinz-Rüdiger Vollbrecht, Altenmarkt, all of Germany

[73] Assignee: SKW Trostberg Aktiengesellschaft, Trostberg, Germany

[21] Appl. No.: 359,856

[22] Filed: Dec. 20, 1994

Related U.S. Application Data

[63] Continuation of Ser. No. 780,510, Oct. 22, 1991, abandoned.

[30] Foreign Application Priority Data

Oct. 25, 1990 [DE] Germany .................. 40 33 934.3

[51] Int. Cl.$^6$ .................................................. A23L 1/222
[52] U.S. Cl. .................................... 426/424; 426/651
[58] Field of Search .................................. 426/424, 651

[56] References Cited

U.S. PATENT DOCUMENTS 3,477,856  11/1969  Schultz ........................... 426/424

FOREIGN PATENT DOCUMENTS 0224215  6/1987  European Pat. Off. .
0240067  10/1987  European Pat. Off. .

*Primary Examiner*—Anthony J. Weier
*Attorney, Agent, or Firm*—Nikaido, Marmelstein, Murray & Oram

[57] ABSTRACT

The present invention provides a process for the production of highly concentrated fruit aromas from condensed fruit vapours, wherein a) the fruit aromas in the fruit vapours are concentrated to a content of 0.05 to 1% by weight according to known methods, b) the concentrate from step a) is subjected to an extraction with compressed carbon dioxide at 60 to 180 bar and 10° to 50° C., and c) after decompression of the carbon dioxide and optionally after the addition of water, the aromarich oily phase is separated from the aroma-poor aqueous phase.

12 Claims, No Drawings

PROCESS FOR THE PRODUCTION OF HIGHLY CONCENTRATED FRUIT AROMAS FROM CONDENSED FRUIT VAPOURS

This application is a continuation of application Ser. No. 07/780,510, filed Oct. 22, 1991, now abandoned.

The present invention is concerned with a process for the production of highly concentrated fruit aromas from condensed fruit vapours such as are obtained in the production of Jam or of fruit or fruit juice concentrates.

For the production of jam, sugar, fruits, pectin solution and acid solution are mixed and thereafter boiled in an open vessel at atmospheric pressure or in a vacuum cooking plant.

For the further use of the vapours evaporated off in the case of boiling, a boiling process at atmospheric pressure is unsuitable since, due to the high temperature stressing, the fruit aroma is too strongly damaged. However, in the case of boiling in a vacuum plant, the temperature is, at most, 65° to 70° C. so that the fruit vapours obtained by condensation can be further worked up.

The production of fruit concentrates, which are required, for example, for the formulation of fruit yoghurts, juices and nectars, usually takes place either by freeze concentration or by evaporation. The damage to flavour, as well as the losses of aroma and colour, are admittedly the smallest in the case of freeze concentration with subsequent freeze storage but this method is also relatively expensive. In the case of the more cost-favourable evaporation method, it is, however, necessary to reckon with certain losses of quality in the case of sensitive types of juices. Attempts have been made to counter the losses which occur by separating off the aroma materials in a first evaporation step and subjecting the aroma-containing vapours obtained in this way to a rectification in a second step in order further to enrich the aroma components. These two steps are carried out in a so-called combined evaporation and aroma-recovery plant in the case of which, for example, about 1 litre of aroma concentrate can be obtained from 100 to 200 litres of juice. This aroma concentrate can then, for example, be added to the rediluted juice before bottling. A disadvantage in the case of aroma concentrates produced in this manner is their low storage stability which has been attributed to their still high water content of 90 to 99% by weight. For the juice producer, this means, for example, that of freshly produced aroma concentrate he must add, for example, 1 litre to 100 litres of rediluted juice in order to achieve a good flavour. However, after several months storage time, it becomes necessary to add 5 litres of aroma concentrate to the same amount of juice in order to obtain the same aroma intensity. This is problematical not only from an economic point of view, but also makes it difficult to produce products having a constant quality.

Therefore, it is an object of the present invention to develop a process for the production of highly concentrated fruit aromas from condensed fruit vapours which does not suffer from the mentioned disadvantages of the prior art but rather, in a technically simple way, gives an aroma concentrate which has a distinctly lower water content and a good storage stability.

Thus, according to the present invention, there is provided a process for the production of highly concentrated fruit aromas from condensed fruit vapours, wherein a) the fruit aromas in the fruit vapours are concentrated by known methods to a content of 0.05 to 1% by weight, b) the concentrate from step a) is subjected to an extraction with compressed carbon dioxide at 60 to 180 bar and 10° to 50° C., as well as c) after decompression of the carbon dioxide and optionally after the addition of water, the aromaricher oily phase is separated from the aroma-poorer aqueous phase.

Surprisingly, we have shown that, in this way, from fruit vapors of very low concentration, there are obtained fruit aroma concentrates of low water content which possess good sensory properties. Admittedly, it is known that, with the help of carbon dioxide high pressure extraction, fruit aromas can be obtained from fruit-containing materials, for example apple peel (cf. E. Bundschuh et al., Deutsche Lebensmittel-Rundschau 84 (1988) p. 205–10) or synthetic fruit essences (cf. V. J. Krukonis, "Characterisation and Measurement of Flavor Compounds", ed. D. D. Bills and C. J. Mussinan, ACS Symp. Series No. 289, 1985) but these are already comparatively highly concentrated starting compounds. Furthermore, only low concentrations of fruit aromas can be produced in this way.

In the case of the process according to the present invention, fruit aromas from condensed fruit vapours, such as are obtained in the case of boiling jam or in the case of the evaporation of fruit juices, in a concentration of 0.0005 to 0,001% by weight, are worked up in the three-step process to give a water-free fruit aroma concentrate.

The fruit aromas can originate from all usual types of fruit such as are conventionally used in the foodstuff industry, for example: apples, pears, plums, cherries, apricots, oranges, strawberries, raspberries, bilberries and the like.

In the first step, the aroma-containing fruit vapours are concentrated to an aroma content of 0.05 to 1% by weight, in which case this concentration step can be carried out by conventional methods according to the prior art.

Conventional processes include, for example, especially distillation, rectification and membrane processes. According to a preferred embodiment of the present invention, the enrichment of the aroma materials is carried out by a vacuum distillation and especially distillation at a pressure of from 20 to 80 mbar and a temperature of from 15° to 40° C. In this way, the enrichment takes place especially gently and without great losses.

Subsequently thereto, the enriched fruit aromas are subjected to an extraction with compressed carbon dioxide at a pressure of 60 to 180 bar, and preferably of 80 to 120 bar, and at a temperature of from 10 to 50° C., and preferably of from 25° to 40° C. The ratio of carbon dioxide to starting aroma concentrate can be varied within wide limits. However, for economic reasons, it has proved to be especially advantageous to adjust the ratio of the amount of carbon dioxide gas to aroma concentrate from step a) of the process according to the present invention to 1:5 to 5:1.

The carbon dioxide extraction can be carried out in conventional high pressure containers. However, for reasons of better separation and economy, the extraction is preferred carried out in a packed column in which compressed carbon dioxide and the aroma concentrate are passed in counter-current.

Subsequently to the carbon dioxide extraction, the stream of carbon dioxide loaded with aroma materials is decompressed in a separation container at a pressure of 20 to 60 bar and a temperature of 10° to 400° C., the fruit aromas are thereby obtained in the separation container in a highly concentrated form. However, they still contain certain amounts of water and ethanol which, as a rule, amount to about 50% by weight, referred to the weight of the fruit aroma concentrate. The carbon dioxide gas is evaporated under the separation conditions and, after compression thereof, is again returned to the carbon dioxide extraction step.

It is important for the present invention that, after the decompression of the carbon dioxide, a separation of the aroma-richer oily phase from the aroma-poorer aqueous phase is carried out. This separation of the oily phase from the aqueous phase can be carried out according to conventional two-phase separation methods, for example decanting or working with a separating funnel, without any problems. If a stable oil-water emulsion has formed, in the scope of the present invention it is also possible to add emulsion-breaking agents, for example water or salt solutions. In this way, there is obtained an aroma concentrate having a small proportion of water (water content<10% by weight) which, in addition, has only a comparatively small ethanol content (<25% by weight). This aroma concentrate can be used directly for the formulation of foodstuffs. The separated aqueous phase, which, besides water and alcohol, still contains a certain amount of fruit aromas, can readily be returned to the extraction step. In this way, it is ensured that, in the case of the process according to the present invention, the aroma losses are reduced to a minimum.

Because of the possibility of recycling not only the carbon dioxide extraction agent but also the aqueous aroma phase obtained, the process according to the present invention is especially suitable for continuous operation.

This is a further important advantage, besides the fact that, with the help of the process according to the present invention, from fruit vapour of very low concentration, with very small technical expense, there can be produced a highly concentrated fruit aroma which has a relatively low content of water and ethanol and which displays good sensory properties and a high storage stability.

The following Examples are given for the purpose of illustrating the present invention:

Example 1

Obtaining a highly concentrated apple aroma oil

From freshly pressed apple juice, 10 to 15% by weight of the juice was evaporated off in an evaporator. The aroma-rich vapours were introduced into the lower third of a rectification column at a temperature separated in 105° C. The water of the first distillation was drawn off at the bottom of the column. The aroma materials were concentrated in the vapour phase and separated from the components of low volatility. The readily volatile aroma components were cooled in the surface of a condenser and drawn off. The greater part of the aroma condensate was returned to the column as reflux. In this way, 1 litre of apple vapour condensate is obtained from about 150 litres of juice.

10 kg of this apple vapour condensate, with an ethanol content of 4.0% by weight and about 0.14% by weight of aroma materials, were continuously extracted in countercurrent with carbon dioxide in a high pressure extraction column. The extraction was carried out at a pressure of 80 bar and a temperature of 35° C. The specific carbon dioxide requirement was 1 kg of carbon dioxide per kg of starting material. As extract, there were obtained 27 g of apple aroma containing 36% by weight of ethanol, 14% by weight of water and 50% by weight of aroma materials in an oily phase. By means of a subsequent separation (without the further addition of water) of the oily phase from the aqueous phase, there could be obtained 19 g of apple aroma concentrate containing 22.4% by weight ethanol, 68% by weight aroma materials and 9.3% by weight water as the end product.

Example 2

Obtaining a highly concentrated strawberry aroma

Before the final concentration of strawberries to 73% by weight of dry substance, about 10% of aroma-containing vapours were evaporated off at 60° C. in a downdraft evaporator. These were concentrated in a rectification column under vacuum (about 80 mbar) at 40° C. In this way, from 100 kg of strawberries there was obtained 1 litre of aroma-containing strawberry vapour condensate.

10 kg of this strawberry vapour condensate with an ethanol content of 3.8% by weight and about 0.2% by weight of aroma materials, were continuously extracted in countercurrent with carbon dioxide in a high pressure extraction column. The extraction was carried out continuously at a pressure of 120 bar and a temperature of 30° C. The specific carbon dioxide requirement was 1 kg of carbon dioxide per kg of starting material. As extract, there were obtained 39 g of strawberry aroma with a content of 33% by weight of ethanol, 53% by weight of aroma materials and 14% by weight of water.

After the addition of 35 g of water, a separation of the oily phase from the aqueous phase was carried out. In this way, there were obtained 25 g of strawberry aroma concentrate containing 70% by weight of aroma materials, 19.6% by weight of ethanol and 10.4% by weight of water as the end product.

We claim:

1. Process for the production of highly concentrated fruit aromas from condensed fruit vapors comprising:

a) Concentrating fruit vapors, having a fruit aroma content of about 0.0005 to 0.001% by weight by distillation;

b) extracting the concentrate from step a) with compressed carbon dioxide at 80 to 120 bar and 25° to 40° C., and c) after decompression of the carbon dioxide, separating the aroma-rich oily phase from the aroma-poor aqueous phase.

2. Process according to claim 1, wherein the concentration of the condensed fruit vapours in step a) is carried out by a vacuum distillation.

3. Process according to claim 2, wherein the vacuum distillation is carried out at a pressure of 20 to 80 mbar and at a temperature of from 15° to 40° C.

4. Process according to claim 1, wherein the ratio of the amount of extractant carbon dioxide gas to aroma concentrate from step a) is 1:5 to 5:1.

5. Process according to claim 1, wherein the carbon dioxide extraction is carried out continuously in countercurrent in a packed column.

6. Process according to claim 1, including the further step of decompressing the carbon dioxide in the extract phase in a separation container at a pressure of 20 to 60 bar and at a temperature of 10° to 40° C.

7. Process according to claim 1, including producing an aroma-poor aqueous phase from said extraction and returning such to said carbon dioxide extraction step.

8. Process according to claim 1 including adding water to the product of said extraction prior to decompression and release of said carbon dioxide from said extract.

9. Process according to claim 1 wherein said distillation is vacuum rectification.

10. In the process of isolating volatile flavoring components from a fruit which comprises:

processing the fruit in a manner such as to form an aqueous fluid containing about 0.0005 to 0.001 weight percent of volatile flavoring components;

extracting said aqueous fluid with liquid carbon dioxide at an elevated pressure, but not an elevated temperature, under conditions sufficient to transfer flavoring components from said fluid to said liquid carbon dioxide to form a leaner aqueous phase and an enriched carbon dioxide phase;

the improvement which comprises:

distilling said aqueous fluid at an elevated temperature to produce a first aqueous concentrate phase comprising about 0.05 to 1 weight percent flavoring components;

extracting said first aqueous concentrate phase with compressed carbon dioxide at a pressure of 80 to 120 bar and a temperature of 25° to 40° C. to form:

a first oily phase enriched in flavoring components containing:
water, and
liquid carbon dioxide, and a second aqueous phase leaner in said flavoring components than said first aqueous concentrate phase;

separating said first oily phase from said second aqueous phase;

decompressing said first oily phase at a pressure of about to 60 bar, and a temperature of about 10° to 40° C., which conditions are sufficient to evaporate carbon dioxide from said first oily phase, and to form a flavoring component rich second oily phase, containing less than about 10% water and less than 25% alcohol, and a flavoring component poor third aqueous phase; and separating said second oily phase from said third aqueous phase.

11. An improved process as claimed in claim 10 wherein said extraction is carried out with an amount of carbon dioxide sufficient to form a proportion thereof with respect to said flavoring components of about 1:5 to 5:1.

12. An improved process as claimed in claim 10 wherein said distilling of said aqueous fluid is a vacuum distillation carried out at a pressure of about 20 to 80 bar and a temperature of about 15° to 40° C.

* * * * *